United States Patent
Kusunoki et al.

(10) Patent No.: US 12,441,920 B2
(45) Date of Patent: Oct. 14, 2025

(54) SEAL RUBBER COMPOSITION AND SEALING MEMBER

(71) Applicants: KOYO SEALING TECHNO CO., LTD., Tokushima (JP); JTEKT CORPORATION, Kariya (JP)

(72) Inventors: Katsuhiko Kusunoki, Itano-gun (JP); Fumiaki Kasahara, Kashiwara (JP)

(73) Assignees: KOYO SEALING TECHNO CO., LTD., Itano-gun (JP); JTEKT CORPORATION, Kariya (JP)

( * ) Notice: Subject to any disclaimer, the term of this patent is extended or adjusted under 35 U.S.C. 154(b) by 542 days.

(21) Appl. No.: 17/948,685

(22) Filed: Sep. 20, 2022

(65) Prior Publication Data

US 2023/0159806 A1    May 25, 2023

(30) Foreign Application Priority Data

Sep. 29, 2021 (JP) ................. 2021-158751

(51) Int. Cl.
| | |
|---|---|
| *C09K 3/10* | (2006.01) |
| *C08F 220/06* | (2006.01) |
| *C08F 220/18* | (2006.01) |
| *C08K 3/04* | (2006.01) |
| *C08K 3/36* | (2006.01) |
| *C08K 7/14* | (2006.01) |

(52) U.S. Cl.
CPC .......... *C09K 3/1006* (2013.01); *C08F 220/06* (2013.01); *C08F 220/18* (2013.01); *C08K 3/04* (2013.01); *C08K 3/36* (2013.01); *C08K 7/14* (2013.01); *C08K 2201/003* (2013.01); *C08K 2201/004* (2013.01)

(58) Field of Classification Search
None
See application file for complete search history.

(56) References Cited

U.S. PATENT DOCUMENTS

| | | | |
|---|---|---|---|
| 2015/0035235 A1 | 2/2015 | Tsuda | |
| 2017/0051123 A1 | 2/2017 | Kawabayashi et al. | |
| 2020/0181370 A1* | 6/2020 | Behabtu | ........... C08L 23/16 |
| 2020/0399451 A1* | 12/2020 | Kawano | ............ C08K 7/14 |
| 2021/0395488 A1* | 12/2021 | Nantaku | ............ H05K 1/03 |

FOREIGN PATENT DOCUMENTS

| | | | | |
|---|---|---|---|---|
| CN | 106750663 | * | 5/2017 | ........... C08K 3/06 |
| JP | H05-179230 A | | 7/1993 | |
| JP | 2017-039822 A | | 2/2017 | |

OTHER PUBLICATIONS

Wollastonite NYAD® 400; NYCO Technical Data Sheet; 2012.
Apr. 15, 2025 Office Action issued in Japanese Patent Application No. 2021-158751.

* cited by examiner

*Primary Examiner* — Katarzyna I Kolb
(74) *Attorney, Agent, or Firm* — Oliff PLC

(57) ABSTRACT

A seal rubber composition contains a carboxyl group-containing acrylic rubber, silica, and two or more inorganic fibers, an amount of the silica per 100 parts by weight of the carboxyl group-containing acrylic rubber is 25 to 100 parts by weight, and a total amount of the inorganic fibers per 100 parts by weight of the carboxyl group-containing acrylic rubber is 35 to 100 parts by weight. A sealing member includes a sliding portion composed of a vulcanized product of the seal rubber composition.

5 Claims, 2 Drawing Sheets

SEAL RUBBER COMPOSITION AND SEALING MEMBER

TECHNICAL FIELD

The present disclosure relates to a seal rubber composition and a sealing member using the seal rubber composition.

This application claims priority on Japanese Patent Application No. 2021-158751 filed on Sep. 29, 2021, the entire content of which is incorporated herein by reference.

BACKGROUND ART

Many oil seals, including oil seals for transmissions and differential gears, are used in automobiles.

Oil seals for automotive applications are required to have reduced torque to meet the demand for increasing fuel efficiency as well as oil sealing performance.

As a method for reducing the torque of a sealing member, a method for reducing the friction of a rubber member sliding against a mating member has been proposed.

Specifically, for example, PATENT LITERATURE 1 proposes a seal member using a seal rubber composition containing a carboxyl-based acrylic rubber, artificial graphite, and a coupling agent. PATENT LITERATURE 1 states that this seal member can reduce friction while maintaining good sealing performance.

CITATION LIST

Patent Literature

PATENT LITERATURE 1: Japanese Laid-Open Patent Publication No. 2017-39822

SUMMARY OF THE INVENTION

Technical Problem

The above oil seals may be used in high-temperature environments.

According to studies by the present inventors, it has been found that a vulcanized product of the seal rubber composition which is proposed in PATENT LITERATURE 1 and in which artificial graphite and a coupling agent are blended with a carboxyl-based acrylic rubber has inferior heat resistance compared to a vulcanized product of a seal rubber composition in which artificial graphite is not blended.

Therefore, a seal member using a seal rubber composition containing artificial graphite may experience an increase in hardness or a decrease in elongation at break when used in high-temperature environments. As a result, the sealing performance of the seal member may be reduced due to reduced followability to a mating member, or a sliding portion thereof may be easily damaged.

Solution to Problem

The present inventors have conducted studies in view of such a situation, and have completed a sealing member that has good heat resistance and whose sealing performance is less likely to be reduced even when the sealing member is used in high-temperature environments.

A seal rubber composition of the present disclosure is a seal rubber composition containing a carboxyl group-containing acrylic rubber, silica, and two or more inorganic fibers, wherein an amount of the silica per 100 parts by weight of the carboxyl group-containing acrylic rubber is 25 to 100 parts by weight, and a total amount of the inorganic fibers per 100 parts by weight of the carboxyl group-containing acrylic rubber is 35 to 100 parts by weight.

The seal rubber composition has the above-described specific constitution. Therefore, by using a vulcanized product of the seal rubber composition for a sliding portion of a sealing member, it is possible to provide a sealing member having good heat resistance and low sliding resistance.

In the seal rubber composition, the inorganic fibers are preferably at least two fibers selected from the group consisting of glass fiber, carbon fiber, and calcium silicate fiber.

This case is more suitable for providing a sealing member having low sliding resistance.

In the seal rubber composition, the inorganic fibers preferably each have an average fiber diameter of 5 to 20 μm and an average fiber length of 10 to 400 μm.

Preferably, the seal rubber composition contains at least glass fiber and calcium silicate fiber as the inorganic fibers, and an amount of the glass fiber per 100 parts by weight of the carboxyl group-containing acrylic rubber is 5 to 20 parts by weight.

This case is further suitable for providing a sealing member having good heat resistance and low sliding resistance.

Preferably, the seal rubber composition further contains carbon black, and an amount of the carbon black per 100 parts by weight of the carboxyl group-containing acrylic rubber is not greater than 10 parts by weight.

In this case, a vulcanized product of the seal rubber composition has good heat resistance and is less likely to cause a change (deterioration) in physical properties due to heat.

A sealing member of the present disclosure includes a sliding portion composed of a vulcanized product of the seal rubber composition.

The sealing performance of the sealing member is less likely to be reduced even when the sealing member is used in high-temperature environments. In addition, the sliding portion has low sliding resistance and is suitable for reducing the torque of the sealing member.

Advantageous Effects of the Invention

According to the present disclosure, it is possible to provide a sealing member that has good heat resistance, whose sealing performance is less likely to be reduced even when the sealing member is used in high-temperature environments, and that has low sliding resistance.

DETAILED DESCRIPTION

Hereinafter, a seal rubber composition according to an embodiment of the present disclosure and an oil seal which is an example of a sealing member according to the embodiment of the present disclosure using the seal rubber composition, will be described.

Figure 1:
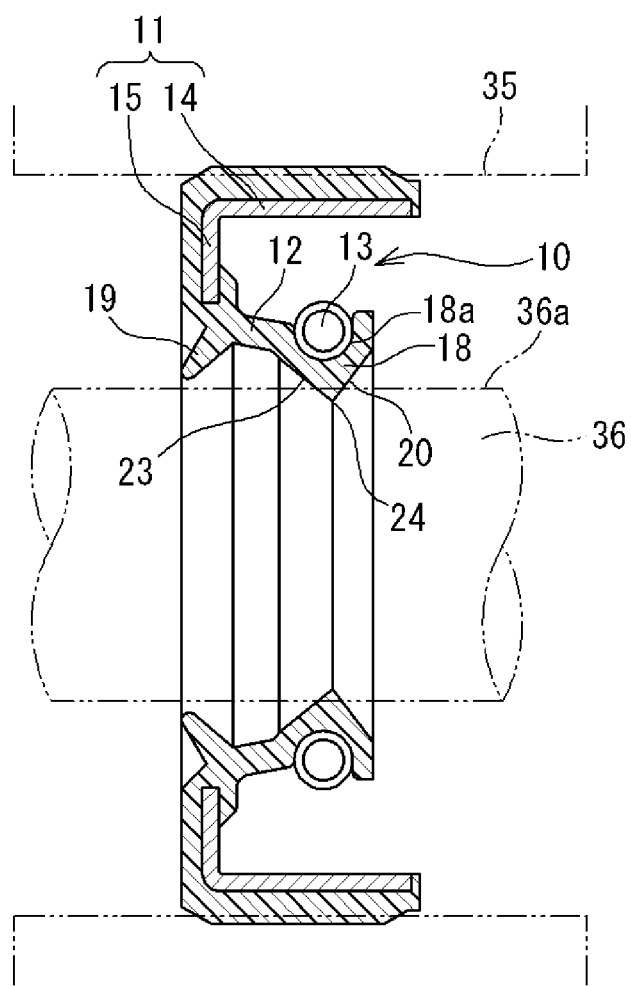
FIG. 1 is a cross-sectional view showing an example of a sealing member.

Fist, the oil seal will be described with reference to FIG. 1.

An oil seal 10 is formed in an annular shape, includes an outer circumferential portion having an outer circumferential surface which is fixed to, for example, a housing 35 of a transmission, or the like, and an inner circumferential portion having a lip tip 24 which is in sliding contact with a lip contact surface 36a which is the shaft surface of a mating member such as a rotary shaft 36, and seals a lubricating oil or the like enclosed in a space between the housing 35 and the rotary shaft 36.

The oil seal 10 is formed by vulcanizing and adhering a metal ring 11 and an elastic member 12. The metal ring 11 is bent and formed in an L cross-sectional shape by a portion 14 parallel to the axial direction and a portion 15 perpendicular to the axial direction. The elastic member 12 is adhered so as to cover the outer circumferential surface of the parallel portion 14 and one axial side surface of the perpendicular portion 15 of the metal ring 11, and includes a protective lip 19 and a head section 18 including the lip tip 24 serving as a portion that is in sliding contact with the rotary shaft 36, on the radially inner side. A garter spring 13 for assisting a tightening force is provided on the outer circumferential surface of the head section 18.

The protective lip 19 extends toward the rotary shaft 36 and prevents dust from passing between the rotary shaft 36 and the protective lip 19. In addition, the protective lip 19 extends so as to be inclined in a direction away from the head section 18.

The head section 18 is located on the inner circumferential side of the parallel portion 14 of the metal ring 11, has an outer circumferential surface having a spring groove 18a into which the garter spring 13 is fitted, and has an inner circumferential surface tapered toward the radially inner side. Therefore, two lip side surfaces 20 and 23 are formed on the inner circumferential surface of the head section 18 on both axial sides so as to be inclined in directions opposite to each other with a tapered lip tip (boundary edge) 24 as a boundary.

The lip side surface 20 which is one lip side surface located away from the protective lip 19 is regarded as a fluid side lip face located on the sealing fluid side, and the lip side surface 23 which is the other lip side surface located on the protective lip 19 side is regarded as a air side lip face. At the head section 18, the lip tip 24 is mainly in sliding contact with the lip contact surface (shaft surface) 36a of the rotary shaft 36. The head section 18 becomes curved radially outwardly when the lip tip 24 comes into contact with the lip contact surface 36a of the rotary shaft 36, and the deformed lip tip 24 and the fluid side lip face 20 and the air side lip face 23, which are close to the lip tip 24, come into contact with the lip contact surface 36a. However, FIG. 1 shows the head section 18 in an uncurved state.

The elastic member 12 which includes the head section 18 serving as a portion sliding against the rotary shaft 36 is composed of a vulcanized product of the seal rubber composition according to the embodiment of the present disclosure. The seal rubber composition contains a carboxyl group-containing acrylic rubber, silica, and two or more inorganic fibers.

Since the elastic member 12 is composed of the vulcanized product, the sealing performance of the oil seal 10 is less likely to be reduced even when the oil seal 10 is used in high-temperature environments. In addition, the oil seal 10 has low sliding resistance and can have reduced torque.

Next, the above seal rubber composition (hereinafter, also simply referred to as rubber composition) will be described.

The rubber composition contains an unvulcanized carboxyl group-containing acrylic rubber, silica, and two or more inorganic fibers.

The carboxyl group-containing acrylic rubber is not particularly limited, and examples of the carboxyl group-containing acrylic rubber include polymers represented by the following formula (1), which are copolymers of a carboxyl group-containing monomer and an acrylic monomer.

[Chem. 1]

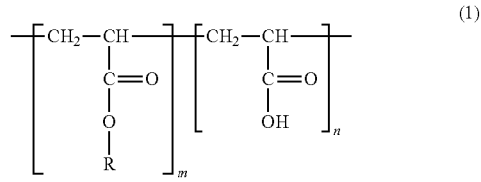

wherein m and n are each independently a positive integer, and R is —$C_2H_5$, —$C_4H_9$, or —$C_2H_4OCH_3$.

In the above formula (1), the ratio (n/m) of n to m is preferably 0.0001 to 0.15. If the ratio (n/m) is less than 0.0001, the mechanical properties of the vulcanized product are insufficient, and the elongation at break of the vulcanized product is greatly decreased, so that it may be impossible for the oil seal 10, which includes the elastic member 12 composed of the vulcanized product, to maintain sealing performance over a long period of time. Also, if the ratio (n/m) is greater than 0.15, the elongation at break of the vulcanized product is greatly reduced, and in this case as well, it may be impossible for the oil seal 10, which includes the elastic member 12 composed of the vulcanized product, to maintain sealing performance over a long period of time.

In the carboxyl group-containing acrylic rubber represented by the above formula (1), each unit having a carboxyl group serves as a cross-linking point, and the carboxyl group-containing acrylic rubber becomes a vulcanized rubber when heated in the presence of a vulcanizing agent.

The carboxyl group-containing acrylic rubber may be a copolymer formed by reacting a carboxyl group-containing monomer, an acrylic monomer, and further a third monomer. Examples of the third monomer include one of butoxyethyl acrylate, ethylene, methyl acrylate, and the like, or a combination of some of these monomers.

As the carboxyl group-containing acrylic rubber, commercially available products can also be used. Examples of commercially available products of the carboxyl group-containing acrylic rubber include Nipol AR-14 and Nipol AR12 (both manufactured by ZEON Corporation), NOXTITE PA-521, NOXTITE PA-522HF, NOXTITE PA-526, and NOXTITE PA-524 (all manufactured by UNIMATEC CO., LTD.), and RACRESTER CH, RACRESTER CT, and RACRESTER CUC (all manufactured by OSAKA SODA CO., LTD.).

As the carboxyl group-containing acrylic rubber, one carboxyl group-containing acrylic rubber may be used, or two or more carboxyl group-containing acrylic rubbers may be used in combination.

The silica may be any silica that can be blended in the rubber composition.

The silica preferably has a pH of not less than 8 and not greater than 12. This is because such silica is suitable for reducing the torque of an oil seal.

In the present disclosure, the pH of the silica is a value obtained by measuring an aqueous suspension containing 4 wt % of the silica with a pH meter.

The pH of the silica can be adjusted, for example, by adjusting the amount of an acid added to an alkaline reaction solution during production of the silica.

The shape of the silica is not particularly limited, and may be, for example, spherical.

In the case where the shape of the silica is spherical, the particle diameter of the silica may be, for example, about 5 nm to 20 μm. The particle diameter of the silica is measured based on JIS Z 8825:2013 Particle size analysis-Laser diffraction methods.

The amount of the silica in the rubber composition per 100 parts by weight of the carboxyl group-containing acrylic rubber is 25 to 100 parts by weight.

If the amount of the silica is less than 25 parts by weight, the hardness of the vulcanized product of the rubber composition becomes low. Therefore, the sealing performance of the oil seal 10 including the elastic member 12 composed of the vulcanized product becomes insufficient. On the other hand, if the amount of the silica exceeds 100 parts by weight, the hardness of the vulcanized product of the rubber composition becomes excessive. Therefore, the oil seal 10 including the elastic member 12 composed of the vulcanized product has reduced followability to the mating member, and has insufficient sealing performance.

The amount of the silica per 100 parts by weight of the carboxyl group-containing acrylic rubber is preferably 30 to 70 parts by weight.

The rubber composition contains two or more inorganic fibers.

By using the rubber composition containing two or more inorganic fibers, the surface of the elastic member 12 composed of the vulcanized product of the rubber composition becomes a non-uniform rough surface. Therefore, the elastic member 12 composed of the vulcanized product of the rubber composition has reduced sliding resistance to the mating member (rotary shaft 36).

The total amount of the inorganic fibers in the rubber composition per 100 parts by weight of the carboxyl group-containing acrylic rubber is 35 to 100 parts by weight.

If the total amount of the inorganic fibers is less than 35 parts by weight, the elastic member 12 composed of the vulcanized product of the rubber composition has increased sliding resistance.

On the other hand, if the total amount of the inorganic fibers exceeds 100 parts by weight, the vulcanized product of the rubber composition becomes excessively hard. Therefore, the elastic member 12 composed of the vulcanized product has poor followability to the mating member, and the oil seal 10 has insufficient sealing performance.

Examples of the above inorganic fibers include glass fiber, carbon fiber, and calcium silicate fiber.

The rubber composition preferably contains at least two of these inorganic fibers. The rubber composition is suitable for forming the elastic member 12 having good heat resistance and having low sliding resistance.

The above glass fiber may be either glass wool (short fiber) or glass fiber (long fiber), but glass fiber (long fiber) is preferable.

The above carbon fiber may be either PAN-based carbon fiber or pitch-based carbon fiber.

The above calcium silicate fiber may be any fibrous or needle-like material containing calcium silicate as a main component, and examples of the calcium silicate fiber include wollastonite.

Here, containing calcium silicate as a main component means that the content of calcium silicate exceeds 50 wt %.

The average fiber diameters of the inorganic fibers are preferably 5 to 20 μm. In addition, the average fiber lengths of the inorganic fibers are preferably 10 to 400 μm.

The rubber composition contains two or more inorganic fibers. The average fiber diameter and the average fiber length of each of the inorganic fibers are preferably in the above ranges. For example, in the case where the rubber composition contains glass fiber and calcium silicate fiber as the inorganic fibers, the glass fiber and the calcium silicate fiber preferably each have an average fiber diameter and an average fiber length within the above-described ranges.

The use of inorganic fibers having such dimensions is suitable for reducing the sliding resistance of the elastic member 12, of the oil seal 10, composed of the vulcanized product of the rubber composition.

The average aspect ratios of the inorganic fibers are preferably 2 to 20.

The fiber length and the fiber diameter of each type of the inorganic fibers are average values calculated from fiber lengths and fiber diameters obtained by randomly selecting 100 inorganic fibers of the same type and observing the selected inorganic fibers with a microscope to measure the fiber length and the fiber diameter of each inorganic fiber. At this time, an optical microscope, a scanning electron microscope, or the like can be used as the microscope.

The aspect ratio of each inorganic fiber is the value obtained by dividing the fiber length by the fiber diameter.

The rubber composition preferably contains at least glass fiber and calcium silicate fiber as the inorganic fibers. This combination is particularly suitable as a combination that reduces the sliding resistance of the elastic member 12 composed of the vulcanized product of the rubber composition. In this case, the rubber composition may contain only two types of glass fiber and calcium silicate fiber as the inorganic fibers, or may contain another inorganic fiber in addition to glass fiber and calcium silicate fiber.

In the case where at least glass fiber and calcium silicate fiber are contained as the inorganic fibers, the amount of the glass fiber per 100 parts by weight of the carboxyl group-containing acrylic rubber is preferably 5 to 20 parts by weight. If the amount of the glass fiber is less than 5 parts by weight, it may be impossible to sufficiently reduce the sliding resistance of the elastic member 12 composed of the vulcanized product of the rubber composition. On the other hand, if the amount of the glass fiber exceeds 20 parts by weight, the vulcanized product of the rubber composition becomes hard, and the sealing performance of the elastic member 12 composed of the vulcanized product may be reduced.

Moreover, in the case where at least glass fiber and calcium silicate fiber are contained as the inorganic fibers, the amount of the calcium silicate fiber per 100 parts by weight of the carboxyl group-containing acrylic rubber is preferably 30 to 70 parts by weight.

The inorganic fibers may be subjected to surface treatment with a silane coupling agent.

In this case, the vulcanized product forming the elastic member 12 has improved tensile strength at break (Tb) and elongation at break (Eb), so that the oil seal 10 becomes more suitable for maintaining low torque performance over a long period of time.

The rubber composition may further contain carbon black.

By containing carbon black, the vulcanized product of the rubber composition can be colored in black. Therefore, stains, etc., on the elastic member 12 composed of the vulcanized product are less likely to be conspicuous.

The amount of the carbon black per 100 parts by weight of the carboxyl group-containing acrylic rubber is preferably not greater than 10 parts by weight.

If the amount of the carbon black exceeds 10 parts by weight, the heat resistance of the vulcanized product of the rubber composition may be decreased.

On the other hand, the lower limit of the amount of the carbon black is not particularly limited, and from the viewpoint of coloring the vulcanized product in black, the amount of the carbon black may be 1 part by weight or more.

The rubber composition does not have to contain carbon black.

The rubber composition further contains a vulcanizing agent. The vulcanizing agent may be any vulcanizing agent capable of cross-linking the carboxyl group-containing acrylic rubber, such as an amine-based vulcanizing agent.

Moreover, the rubber composition may contain a vulcanization accelerator such as guanidine compounds, sulfenamide compounds, 1,8-diazabicyclo [5.4.0] undeca-7-ene, and tertiary amines, and a processing aid such as saturated fatty acids (for example, stearic acid, etc.) and microcrystalline waxes, as necessary.

Furthermore, the rubber composition may contain other known additives that are blended in an oil seal, such as an antioxidant, an antiozonant, and a plasticizer.

Preferably, the rubber composition does not contain graphite.

This is because, in the case where graphite is contained, the vulcanized product of the rubber composition has inferior heat resistance.

The normal physical properties of the vulcanized product of the rubber composition are preferably the following physical properties.

Here, the normal physical properties are the physical properties measured after the rubber composition is vulcanized and then stored at normal temperature for 24 hours.

The vulcanized product of the rubber composition preferably has a durometer A hardness of A70 to A90.

If the durometer A hardness of the vulcanized product is less than A70, the tightening force of the elastic member 12 to the mating member (rotary shaft 36) may be insufficient, and oil leakage may occur.

On the other hand, if the durometer A hardness of the vulcanized product exceeds A90, the followability of the elastic member 12 to the mating member may be insufficient, and in this case as well, oil leakage may occur.

The durometer A hardness may be measured by a method conforming to JIS K 6253-3:2012.

The tensile strength at break (Tb) of the vulcanized product of the rubber composition is preferably not less than 8.0 MPa.

Moreover, the elongation at break (Eb) of the vulcanized product of the rubber composition is preferably not less than 100%.

When the vulcanized product satisfies these tensile properties, the elastic member 12 has sufficient mechanical strength and is suitable for ensuring sealing performance as an oil seal over a long period of time.

The tensile strength at break (Tb) and the elongation at break (Eb) may be measured by a method conforming to JIS K 6251:2017.

The oil seal 10 according to the present embodiment can be produced, for example, through the following steps.

(1) First, a rubber composition containing an unvulcanized carboxyl group-containing acrylic rubber, silica, two or more inorganic fibers, and a vulcanizing agent, and further various additives such as a vulcanization accelerator and a processing aid to be blended as necessary, is prepared. The rubber composition may be prepared by weighing each blending component in advance and kneading these components with a kneading machine such as a roll or a kneader.

(2) Next, the rubber composition is injected into a mold, and is vulcanized and molded under predetermined conditions.

In this step, preferably, when vulcanizing and molding the rubber composition, the metal ring 11 is provided inside the mold in advance, and the metal ring 11 and the elastic member 12 are vulcanized and adhered together. Accordingly, the man-hours of production can be reduced.

(3) Then, the molded article is taken out from the mold, and the garter spring 13 is fitted thereto to complete the oil seal 10.

Other Embodiment

The sealing member according to the embodiment of the present disclosure is not limited to an oil seal, and may be, for example, a dust seal, another seal member, or the like.

Since the sealing member according to the embodiment of the present disclosure has excellent heat resistance, the sealing member is suitable for use, for example, as an oil seal used at a location that may be exposed to a high-temperature environment of about 150° C.

EXAMPLES

Hereinafter, the embodiment of the present disclosure will be more specifically described by means of examples, but the embodiment of the present disclosure is not limited to the examples below.

In each of Examples and Comparative Examples, a rubber composition was prepared, a sheet composed of a vulcanized product of each rubber composition was produced, and the physical properties of the obtained sheet were measured. The blending formula of each rubber composition is shown in Table 1. In addition, the measurement results of the physical properties are shown in Table 2.

The blending chemicals used in the preparation of the rubber compositions in Examples and Comparative Examples are as follows.

Carboxyl group-containing acrylic rubber
Nipol AR-14 (manufactured by ZEON Corporation)
Silica
Nipseal ER (manufactured by TOSOH CORPORATION)
Inorganic fiber (glass fiber)
MF06JB1-20 (manufactured by Asahi Fiber Glass Co., Ltd.), fiber diameter=10 μm, fiber length=63 μm
Inorganic fiber (calcium silicate fiber)
NYAD 400 (manufactured by NYCO Minerals, Inc.), fiber diameter=7 μm, fiber length=35 μm
Carbon black
SEAST SO (manufactured by TOKAI CARBON CO., LTD.)
Graphite
Artificial graphite (manufactured by SEC CARBON, LIMITED), average particle diameter: 6 μm Others Processing aid: stearic acid (TST) (manufactured by MIYOSHI OIL & FAT CO., LTD.)

Antioxidant: NONFLEX LAS-P (manufactured by Seiko Chemical Co., Ltd.)

Antiozonant: SUNTIGHT S (manufactured by Seiko Chemical Co., Ltd.)

Silane coupling agent: DOWSIL Z-6076 SILANE (manufactured by DuPont Toray Specialty Materials K.K.)

Plasticizer: ADEKACIZER RS-1000 (manufactured by ADEKA Corporation)

Vulcanizing agent: Sanfel 6-MC (manufactured by SAN-SHIN CHEMICAL INDUSTRY CO., LTD.)

Vulcanization accelerator: RHENOGRAN XLA-60 (manufactured by LANXESS)

Example 1

(1) A rubber composition was obtained by kneading 100 parts by weight of the carboxyl group-containing acrylic rubber, 55 parts by weight of the silica, 5 parts by weight of the glass fiber, 35 parts by weight of the calcium silicate fiber, 5 parts by weight of the carbon black, 2 parts by weight of the processing aid, 2 parts by weight of the antioxidant, 3 parts by weight of the antiozonant, 1 part by weight of the silane coupling agent, 10 parts by weight of the plasticizer, 0.6 parts by weight of the vulcanizing agent, and 2 parts by weight of the vulcanization accelerator with a roll.

(2) The rubber composition obtained in the above (1) was injected into a mold, then primary vulcanization was performed at 170° C. for 3 minutes, and secondary vulcanization was further performed at 190° C. for 1 hour to produce a sheet having a thickness of 2 mm and composed of a vulcanized product of the rubber composition.

Example 2

A sheet was produced in the same manner as Example 1, except that the blending amount of the glass fiber was changed to 10 parts by weight.

Example 3

A sheet was produced in the same manner as Example 2, except that the blending amount of the calcium silicate fiber was changed to 45 parts by weight.

Example 4

A sheet was produced in the same manner as Example 2, except that the blending amount of the calcium silicate fiber was changed to 65 parts by weight.

Example 5

A sheet was produced in the same manner as Example 1, except that the blending amount of the glass fiber was changed to 20 parts by weight.

Example 6

A sheet was produced in the same manner as Example 1, except that the blending amount of the glass fiber was changed to 40 parts by weight.

Comparative Example 1

A sheet was produced in the same manner as Example 1, except that the glass fiber and the calcium silicate fiber were not blended.

Comparative Example 2

A sheet was produced in the same manner as Example 1, except that the glass fiber was not blended.

Comparative Example 3

A sheet was produced in the same manner as Example 1, except that the blending amount of the glass fiber was 35 parts by weight and the calcium silicate fiber was not blended.

Comparative Example 4

A sheet was produced in the same manner as Comparative Example 2, except that 30 parts by weight of the graphite was further blended.

Comparative Example 5

A sheet was produced in the same manner as Comparative Example 2, except that the blending amount of the carbon black was changed to 15 parts by weight.

TABLE 1

|  | | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| Carboxyl group-containing acrylic rubber (uncrosslinked) | | 100 | 100 | 100 | 100 | 100 | 100 | 100 | 100 | 100 | 100 | 100 |
| Processing aid | | 2 | 2 | 2 | 2 | 2 | 2 | 2 | 2 | 2 | 2 | 2 |
| Antioxidant | | 2 | 2 | 2 | 2 | 2 | 2 | 2 | 2 | 2 | 2 | 2 |
| Antiozonant | | 3 | 3 | 3 | 3 | 3 | 3 | 3 | 3 | 3 | 3 | 3 |
| Silica | | 55 | 55 | 55 | 55 | 55 | 55 | 55 | 55 | 55 | 55 | 55 |
| Graphite | | — | — | — | — | — | — | — | — | — | 30 | — |
| Carbon black | | 5 | 5 | 5 | 5 | 5 | 5 | 5 | 5 | 5 | 5 | 15 |
| Inorganic fiber | Glass fiber | 5 | 10 | 10 | 10 | 20 | 40 | — | — | 35 | — | — |
| | Calcium silicate fiber | 35 | 35 | 45 | 65 | 35 | 35 | — | 35 | — | 35 | 35 |

TABLE 1-continued

|  | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|
| Silane coupling agent | 1 | 1 | 1 | 1 | 1 | 1 | 1 | 1 | 1 | 1 | 1 |
| Plasticizer | 10 | 10 | 10 | 10 | 10 | 10 | 10 | 10 | 10 | 10 | 10 |
| Vulcanizing agent | 0.6 | 0.6 | 0.6 | 0.6 | 0.6 | 0.6 | 0.6 | 0.6 | 0.6 | 0.6 | 0.6 |
| Vulcanization accelerator | 2 | 2 | 2 | 2 | 2 | 2 | 2 | 2 | 2 | 2 | 2 |
| Total | 220.6 | 225.6 | 235.6 | 255.6 | 235.6 | 255.6 | 180.6 | 215.6 | 215.6 | 245.6 | 225.6 |

\* In the table, the unit for blended amounts is "part(s) by weight".

Figure 2:
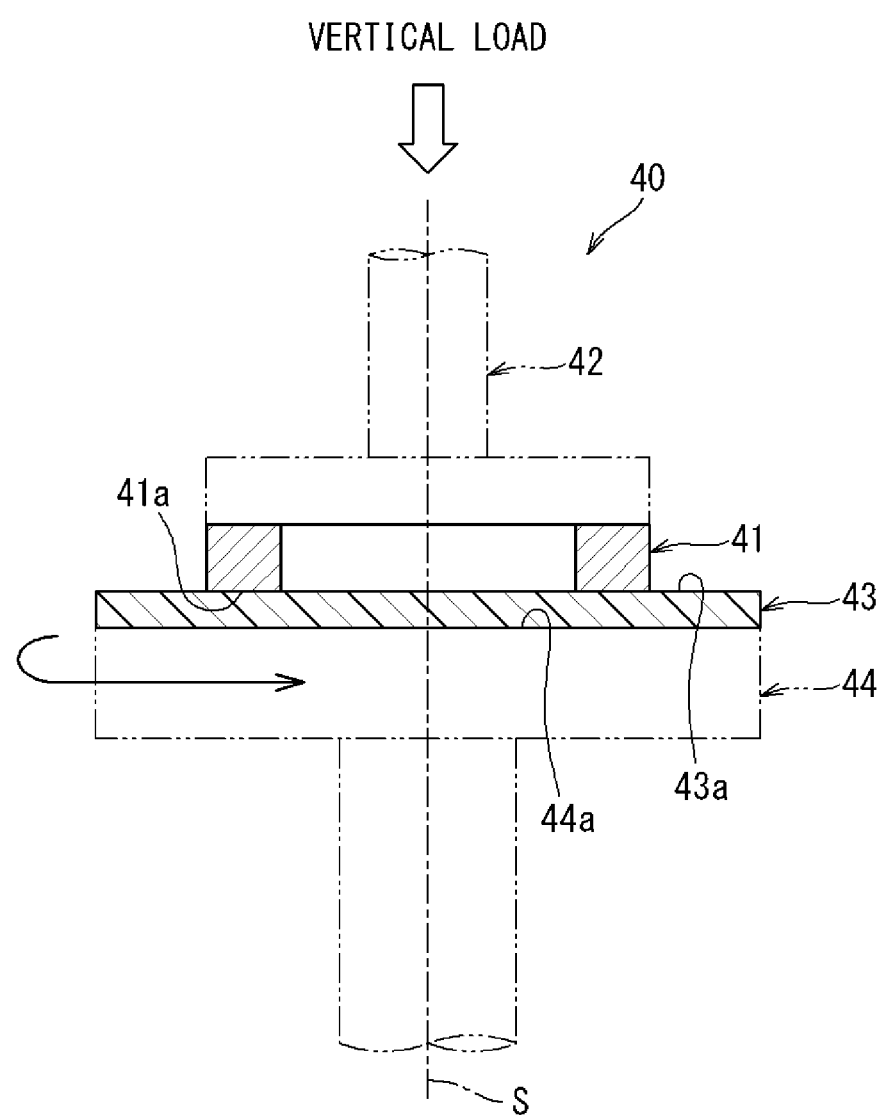
FIG. 2 is a schematic diagram showing a test device used for a friction abrasion test.

The physical properties of the sheet prepared in each of Examples and Comparative Examples were measured by the following methods.
(1) Evaluation of Normal Physical Properties
(1-1) Durometer A Hardness:
A sheet cut out with dimensions of 30×50 mm was used as a test piece.
A durometer A hardness was measured by a method conforming to "JIS K 6253-3: 2012" using a type A durometer. Three test pieces were stacked, and the measurement was performed.
(1-2) Tensile Strength at Break (Tb) and Elongation at Break (Eb):
A dumbbell-shaped No. 3 test piece cut out from the sheets was prepared.
A tensile test was performed in accordance with "JIS K 6251:2017". At this time, the tensile speed was 500 mm/min, and the number of test pieces was 3.
(2) Evaluation after Aging Test
(2-1) Accelerated Aging Test (Method A):
An accelerated aging test (Method A) was performed by a method conforming to "JIS K 6257:2017" using a sheet (test piece) cut out with dimensions of 30×50 mm and a dumbbell-shaped No. 3 test piece.
The test device used was a forced circulation type heat aging tester (crosswind type).
The test piece was prepared by the same method as in the above (1-1) and (1-2).
The test conditions were 150° C. and 1008 hours.
(2-2) Physical Properties after Aging Test:
The test piece subjected to the above aging test was measured for durometer A hardness, tensile strength at break (Tb), and elongation at break (Eb) by the same methods as in the above (1-1) and (1-2).
(3) Friction Abrasion Test:
A sheet cut out in the shape of a disk having a diameter of 46 mm was used as a test piece.
A friction abrasion test was performed using the test piece, and a coefficient of dynamic friction was measured.
FIG. 2 is a schematic diagram showing a test device used for the friction abrasion test.

A friction abrasion test device 40 can rotate the test piece and an annular measurement jig relative to each other in a state where the test piece and the measurement jig are pressed at a constant load, and can measure the coefficient of friction at that time.
The friction abrasion test device 40 includes a holding portion 42 which holds a measurement jig 41, and a stage 44 which supports a test piece 43.
The holding portion 42 is configured to be able to apply a vertical load at a preset value in a state where a lower surface 41a of the measurement jig 41 is brought into contact with an upper surface 43a of the test piece 43.
The test piece 43 is fixed to the upper surface 44a of the stage 44 so as to be integrally rotatable therewith. The stage 44 is rotatable about a central axis S of the measurement jig 41, and rotates the test piece 43 and the measurement jig 41 brought into contact with each other, relative to each other. Accordingly, the test piece 43 and the measurement jig 41 slide against each other.
The friction abrasion test device 40 is configured to be able to measure the frictional force generated between the test piece 43 and the measurement jig 41 when the test piece 43 and the measurement jig 41 slide against each other. The friction abrasion test device 40 converts the frictional force obtained through the measurement into a coefficient of friction, and outputs the coefficient of friction.
As the coefficient of friction, a value at the end of the test is used.
The test conditions for the friction abrasion test are shown below.
Test Conditions
Test device: Friction abrasion Tester EFM-III-F (manufactured by ORIENTEC CORPORATION)
Measurement jig: outer diameter 25.6 mm, inner diameter 20.0 mm, thickness 15.0 mm, material S45C, surface roughness Ra=0.8 μm
Vertical load: 5 kg
Surface pressure: 0.24 MPa
Rotation speed: 500 rpm
Peripheral speed: 0.6 m/s
Test time: 10 min
Room temperature: 25° C.

TABLE 2

|  |  | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| Normal physical properties | | | | | | | | | | | | |
| Hardness | (A) | 74 | 74 | 75 | 79 | 79 | 83 | 66 | 73 | 73 | 82 | 77 |
| Tensile strength at break | (MPa) | 9.0 | 8.5 | 9.0 | 8.0 | 8.0 | 7.4 | 9.3 | 8.1 | 7.9 | 7.6 | 9.4 |

TABLE 2-continued

|  |  | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| Elongation at break | (%) | 120 | 140 | 130 | 120 | 110 | 80 | 130 | 140 | 130 | 90 | 130 |
| Accelerated aging test (Method A) 150° C. × 1008 h | | | | | | | | | | | | |
| Hardness | (A) | 82 | 83 | 84 | 86 | 87 | 90 | 76 | 83 | 81 | 95 | 90 |
| Tensile strength at break | (MPa) | 7.4 | 7.2 | 7.5 | 6.8 | 7.0 | 6.8 | 6.0 | 6.7 | 6.7 | 11.8 | 8.5 |
| Elongation at break | (%) | 90 | 100 | 100 | 80 | 80 | 50 | 90 | 80 | 100 | 20 | 40 |
| Friction abrasion test | | | | | | | | | | | | |
| Coefficient of friction u | | 1.2 | 0.9 | 1.0 | 1.0 | 1.1 | 1.1 | 2.1 | 1.5 | 1.6 | 1.5 | 1.8 |

As shown in Table 2, the coefficients of friction of the vulcanized products (sheets) produced in Examples 1 to 6 were lower than those of the vulcanized products produced in Comparative Examples 1 to 5.

Moreover, the physical properties of the vulcanized products produced in Examples 1 to 6 were less likely to change even through the accelerated aging test, as compared to the vulcanized products produced in Comparative Examples 1 to 5.

REFERENCE SIGNS LIST 10 oil seal
11 metal ring
12 elastic member
13 garter spring
18 head section
19 protective lip
20 fluid side lip face
23 air side lip face

The invention claimed is:

1. A seal rubber composition containing a carboxyl group-containing acrylic rubber, silica, and two or more inorganic fibers, wherein
an amount of the silica per 100 parts by weight of the carboxyl group-containing acrylic rubber is 25 to 100 parts by weight,
a total amount of the inorganic fibers per 100 parts by weight of the carboxyl group-containing acrylic rubber is 35 to 90 parts by weight,
at least glass fiber and calcium silicate fiber are contained as the inorganic fibers,
an amount of the glass fiber per 100 parts by weight of the carboxyl group-containing acrylic rubber is 5 to 20 parts by weight, and
an amount of the calcium silicate fiber per 100 parts by weight of the carboxyl group-containing acrylic rubber is 30 to 70 parts by weight.

2. The seal rubber composition according to claim 1, wherein the inorganic fibers each have an average fiber diameter of 5 to 20 μm and an average fiber length of 10 to 400 μm.

3. The seal rubber composition according to claim 1, further containing carbon black, wherein
an amount of the carbon black per 100 parts by weight of the carboxyl group-containing acrylic rubber is not greater than 10 parts by weight.

4. A sealing member comprising a sliding portion composed of a vulcanized product of the seal rubber composition according to claim 1.

5. A sealing member comprising a sliding portion composed of a vulcanized product of the seal rubber composition according to claim 3.

* * * * *